(12) United States Patent
Iliadis

(10) Patent No.: US 9,262,339 B2
(45) Date of Patent: Feb. 16, 2016

(54) MANAGING WRITE OPERATIONS IN A COMPUTERIZED MEMORY

(71) Applicant: INTERNATIONAL BUSINESS MACHINES CORPORATION, Armonk, NY (US)

(72) Inventor: Ilias Iliadis, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/742,348

(22) Filed: Jun. 17, 2015

(65) Prior Publication Data

US 2015/0286579 A1   Oct. 8, 2015

Related U.S. Application Data

(63) Continuation of application No. 13/659,072, filed on Oct. 24, 2012, now Pat. No. 9,092,316.

(30) Foreign Application Priority Data

Oct. 28, 2011 (EP) .................................. 11187100

(51) Int. Cl.
*G06F 12/00* (2006.01)
*G06F 12/12* (2006.01)
*G06F 12/02* (2006.01)

(52) U.S. Cl.
CPC .......... *G06F 12/123* (2013.01); *G06F 12/0246* (2013.01); *G06F 2212/69* (2013.01); *G06F 2212/7201* (2013.01)

(58) Field of Classification Search
CPC ................ G06F 12/02; G06F 12/0246; G06F 2212/7205; G06F 2212/7209
See application file for complete search history.

(56) References Cited

U.S. PATENT DOCUMENTS

| | | |
|---|---|---|
| 2007/0288531 A1 | 12/2007 | Motta |
| 2011/0029715 A1 | 2/2011 | Hu |
| 2011/0066808 A1 | 3/2011 | Flynn |
| 2011/0078496 A1 | 3/2011 | Jeddeloh |
| 2011/0093648 A1 | 4/2011 | Belluomini |
| 2011/0145473 A1 | 6/2011 | Maheshwari |

FOREIGN PATENT DOCUMENTS

WO    WO 2011/033450 A1    3/2011

OTHER PUBLICATIONS

Rosenblum, et al., The Design and Implementation of a Log-Structured File System, ACM Transactions on Computer Systems, vol. 10, No. 1, pp. 26-52, Feb. 1992.
Hu, et al., Write Amplification Analysis in Flash-Based Solid State Drives, Israeli Experimental Systems Conference (SYSTOR), Haifa, Israel, pp. 1-9, May 2009.
Hu, et al., Container Marking: Combining Data Placement, Garbage Collection and Wear Leveling for Flash, IBM Research, Zurich, Switzerland.

*Primary Examiner* — Gurtej Bansal
(74) *Attorney, Agent, or Firm* — Tutunjian & Bitetto, P.C.; Jeff Tang

(57) ABSTRACT

A method, computer program product, and storage device for managing a computerized memory for storing data are disclosed. Data updates are performed by writing data updates out-of-place where data updates to outdated data are written to a subunit different from a subunit containing the outdated data. The subunit containing the outdated data is invalid, while a subunit containing up-to-date data is a valid subunit. A data structure is maintained for providing the m units in a sorted way. A first subset of n units is selected out of the set of m units with n<m by selecting units from n positions in the data structure. It is searched in the first subset to identify a unit that matches a predetermined criterion, and data of valid subunits of a unit identified in the first subset is rewritten into at least another unit.

14 Claims, 3 Drawing Sheets

MANAGING WRITE OPERATIONS IN A COMPUTERIZED MEMORY

CROSS-REFERENCE TO RELATED APPLICATION

This application is a Continuation application of co-pending U.S. patent application Ser. No. 13/659,072, filed on Oct. 24, 2012, which, in turn, claims priority under 35 U.S.C. §119 from European Patent Application No. 11187100.0, filed Oct. 28, 2011, the entire contents of which are incorporated herein by reference.

BACKGROUND OF THE INVENTION

1. Field of the Invention

The present invention relates to managing a computerized memory for storing data.

2. Description of Related Art

Solid-state memory devices encompass rewritable non-volatile memory devices which can use electronic circuitry for storing data. Currently, solid-state memory devices start replacing conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with an appreciated robustness due to lack of moveable parts.

However, writing data to a solid-state memory device such as a flash memory device requires paying attention to specifics in the flash technology: NAND flash memory is organized in pages and blocks. Multiple pages form a block. While read and write operations can be applied to pages as a smallest entity of such operation, erase operations can only be applied to entire blocks. And while in other storage technologies outdated data can simply be overwritten by up-to-date data, flash technology requires an erase operation before up-to-date data can be written to an erased block.

Because flash technology erase operations take much longer than read or write operations, a writing technique is applied called "write out of place" in which new or updated data is written to some free page offered by a free page allocator instead of writing it to the same page where the outdated data resides. The page containing the outdated data is marked as invalid page.

The more data is written over time, the less free pages can be offered and new blocks can need to be reclaimed for a free block queue, i.e. a queue for providing free, i.e. erased blocks for writing new, i.e. updated data to. New free blocks need to be reclaimed from blocks filled with valid and/or invalid data. The block reclaiming process—also known in literature as "garbage collection process"—first identifies blocks for cleaning based on a given policy. Then valid data still residing in these blocks is copied (relocated) to other blocks, and finally the blocks that now are free from valid data are erased and become available again for rewriting. Consequently, the reclaiming mechanism introduces additional read and write operations, the extent of which depends on the specific policy deployed as well as on system parameters. The additional write operations result in the multiplication of user writes, a phenomenon referred to as "write amplification". As the number of erase/write operations that can be performed before a solid state storage device wears out is limited, the extent of the write amplification is critical because it negatively affects the lifetime and endurance of solid state storage devices. Therefore, a reclaiming mechanism is efficient when it keeps the write amplification as low as possible, and also achieves a good wear leveling in the sense of blocks being worn out as evenly as possible.

In connection with log-structured file systems implemented on a hard disk reclaiming mechanisms are discussed. In "The Design and Implementation of a Log-Structured File System" by M. Rosenblum and J. Ousterhout, ACM Transactions on Computer Systems, Volume 10, No 1, pages 26-52, February 1992, a technique for disk storage management called a log-structured file system is introduced which writes all modifications to a disk sequentially in a log-like structure, thereby speeding up both file writing and crash recovery. The log is the only structure on the disk; it contains indexing information so that files can be read back from the log efficiently. In order to maintain large free areas on disk for fast writing, the log is divided into segments and uses a segment cleaner to compress the live information from heavily fragmented segments. One of the cleaners introduced uses a policy where it always chooses the least-utilized segments to clean.

When put in context with a flash-based solid state drive, the above policy introduces the usage of blocks only with the smallest number of valid pages for erasure, such that it yields the most amount of free space for reclaiming by means of a single action. As systems encountered in practice are comprised of thousands of blocks, the above reclaiming process can take a substantial amount of time to examine all of the blocks in order to select the block with the minimum amount of valid pages. This is also the case when the number of valid pages of blocks is constantly updated upon each host write. Depending on the processor's capabilities the time required can be prohibitively long.

To reduce the number of CPU cycles consumed by the such reclaiming process a windowed reclaiming scheme is proposed in "Write Amplification Analysis in Flash-Based Solid State Drives" by X.-Y. Hu, E. Eleftheriou, R. Haas, I. Iliadis, and R. Pletka, in Proceedings of the Israeli Experimental Systems Conference (SYSTOR), Haifa, Israel, pp. 1-9, May 2009. According to this scheme, occupied blocks are maintained in a queue according to the order in which they have been written, with the oldest blocks occupying the first positions. The windowed reclaiming process restricts the selection process to the oldest w blocks only.

SUMMARY OF THE INVENTION

One aspect of the present invention provides a method for managing a computerized memory for storing data where the memory includes a set of m units and each of the m units include subunits, the method including: maintaining a data structure for providing the m units in a sorted way, selecting a first subset of n units out of the set of m units with n<m by selecting units from n positions in the data structure searching in the first subset to identify a unit that matches a predetermined criterion, and rewriting data of valid subunits of the unit identified in the first subset into at least another unit, and selecting a second subset of p units out of the set of m units with p<m by selecting units from p positions in the data structure, searching in the second subset to identify a unit that matches a predetermined criterion, and rewriting data of valid subunits of the unit identified in the second subset into at least another unit, where the p positions in the data structure differ in at least one position from the n positions in the data structure, where (i) data updates are performed by writing data updates out-of-place, (ii) data updates to outdated data are written to a subunit different from a subunit containing the outdated data, and (iii) the subunit containing the outdated data is invalid, while a subunit containing up-to-date data is a valid subunit.

Another aspect of the present invention provides a method for managing a computerized memory for storing data where the memory includes a set of m units and each of the m units out of the set of m units include subunits, the method including: maintaining a data structure in which the m units are sorted according to an age of the units where the age of the unit is defined as a time period since the unit was last written, selecting a first subset of n units out of the set of m units with n<m by selecting units from n positions in the data structure, where at least one unit out of the n units of the first subset is selected from a position in the data structure that holds a unit younger than the n oldest units in the data structure, searching in the first subset to identify a unit that matches a predetermined criterion, and rewriting data of valid subunits of a unit identified in the first subset into at least another unit, where (i) data updates are performed by writing data updates out-of-place, (ii) data updates to outdated data are written to a subunit different from a subunit containing the outdated data, and (iii) the subunit containing the outdated data is invalid, while a subunit containing up-to-date data is a valid subunit.

Another aspect of the present invention provides a storage device, including: a memory including a set of m units where each of the m units includes subunits and the subunits contain either up to date data in a valid subunit or outdated data in an invalid subunit, a data structure in which the m units are sorted according to an age of the units where the age of a unit is defined as a time period since the unit was last written, a memory controller adapted to write data updates to a subunit different from the subunit the outdated data is contained, where the memory controller is further adapted to (i) select a first subset of n units out of the set of m units with n<m by selecting units from n positions in the data structure, (ii) search in the first subset to identify a unit that matches a predetermined criterion, and (iii) rewrite data of valid subunits of a unit identified in the first subset into at least another unit, and where the memory controller is further adapted to (i) select a second subset of p units out of the set of m units with p<m by selecting units from p positions in the data structure, (ii) search in the second subset to identify a unit that matches a predetermined criterion, and (iii) rewrite data of valid subunits of a unit identified in the second subset into at least another unit, and where the p positions in the data structure differ in at least one position from the n positions in the data structure.

Another aspect of the present invention provides a storage device, including: a memory including a set of m units where each of the m units includes subunits and a subunit contain either up to date data in a valid subunit or outdated data in an invalid subunit, and a data structure in which the m units are sorted according to an age of the units where the age of the unit is defined as a time period since the unit was last written, a memory controller adapted to write data updates to a subunit different from the subunit the outdated data is contained, where the memory controller is further adapted to select a first subset of n units out of the set of m units with n<m by selecting units from n positions in the data structure, and where at least one unit out of the n units of the first subset is selected from a position in the data structure that holds a unit younger than the n oldest units in the data structure.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION OF THE PREFERRED EMBODIMENTS

Figure 1:
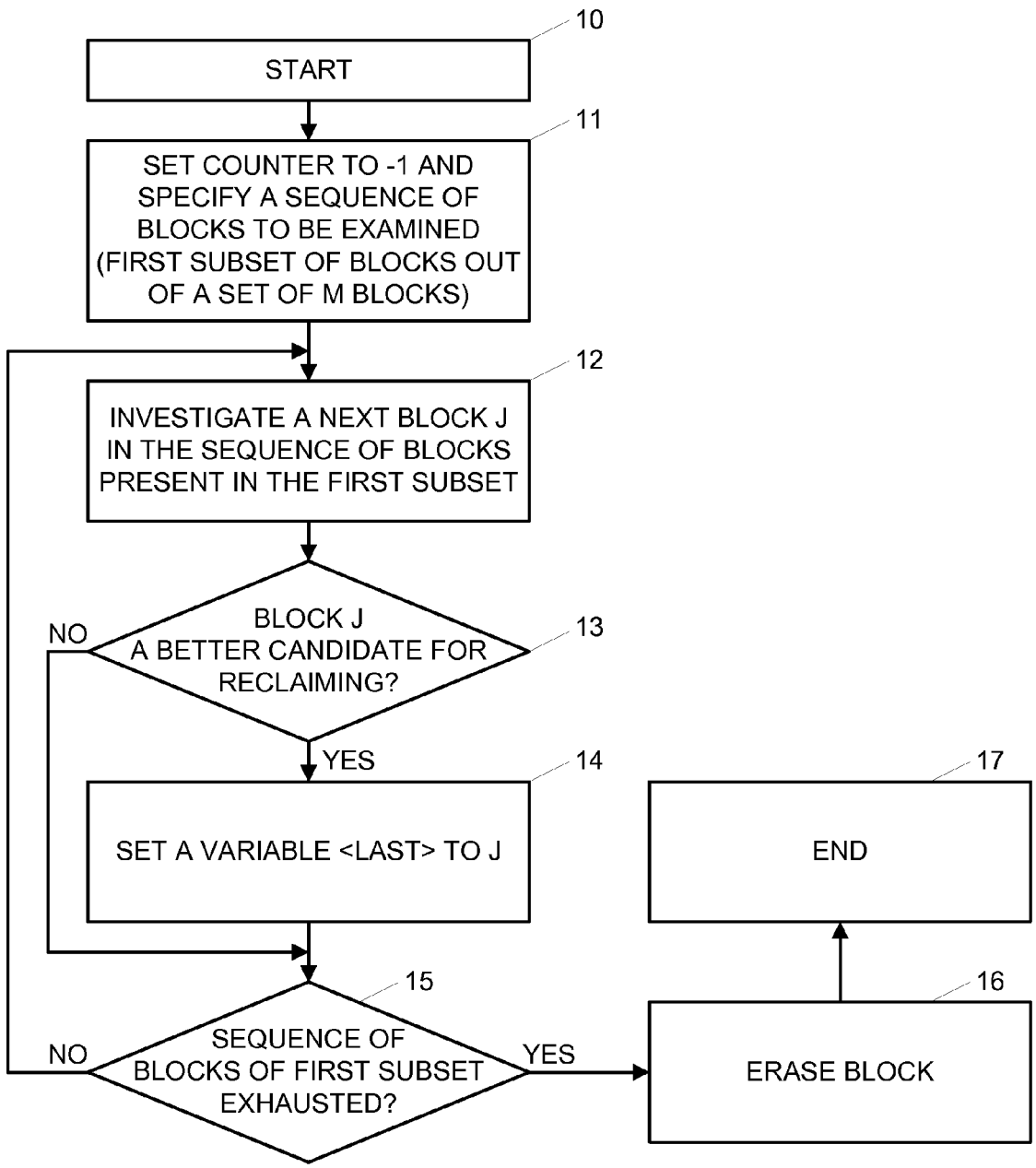
FIG. 1 is a flow diagram of a method according to an embodiment of the present invention.

In the following, it can be referred to blocks instead of units, and to pages instead of subunits. Blocks and pages follow a nomenclature used in connection with flash-based solid-state storage devices. For the entire application it is understood that neither the content nor the scope of protection shall be restricted to the flash-based storage technology. Any other solid state storage technology such phase change memories and magnetic RAM memories shall be encompassed. Also log structured arrays shall be encompassed where data updates to outdated data are not written to the subunit containing the outdated data, but to other subunits denoted collectively as a log which provides which typically cannot be subunits subsequent to each other in the organization of the storage device but can be scattered around the storage device and be offered by an allocation engine.

As an introduction to the following description, it is first pointed at a general aspect of the invention, concerning a way of managing a computerized memory for storing data, and in particular for identifying a unit in the memory which unit is to be prepared for erasure.

In memories of interest data is stored in units where each of the units includes subunits. The separation of the memory space into units and subunits can be owed to physical or technological characteristics of such memories according to which e.g. a unit can constitute the smallest entity for erase operations while a subunit can constitute the smallest entity for read or write operations. In such memories, data updates are written to a subunit or unit different to the subunit or unit the outdated data is contained in. The one or more subunits containing the outdated data are invalid. During operation, in a representative unit invalid subunits can exist next to valid subunits where a subunit containing data up to date is considered a valid subunit. Invalid subunits can be marked as such. Or, a data structure specifying a validity/invalidity property of the subunits can be maintained. Over time, more and more units can contain a mix of valid and invalid subunits where some of the units can contain more valid subunits than invalid subunits and others can contain more invalid subunits than valid subunits. The more data is written to such memory, the more limited the free memory space available for writing becomes.

In the flash memory arena, a data structure or engine respectively denoted as free block queue or free block allocator provides blocks free of data and ready to be written. A free block typically is a block that was recently erased and is not rewritten yet. However, such free block queue can dry out and can no longer provide a sufficient number of free blocks for the current data input such that a process is triggered for reclaiming one or more blocks. Reclaiming a block basically is understood as converting a block yet containing data—be it valid or invalid or both—into a free block by erasing the existing data from such block. The block reclaiming mechanism first identifies blocks for cleaning/erasing according to a given policy. Any valid data in an identified block is subsequently copied/relocated to other blocks of the memory, and finally the identified block/s is/are erased so that it/they become/s available for rewriting. Such block reclaiming process requires additional read and write operations and its computation time depends on the policy for identifying such blocks and also on the amount of valid data contained in these blocks. It was found, however, that the system performance is primarily affected by the write operations for the following reasons: First, the times required to write data are much longer than those to read data. Second, the number of erase/write operations that can be performed before a flash memory device wears out is limited. Consequently, the extent of these additional writes, referred to as "write amplification", is desired to be kept low in order to prolong the lifetime and endurance of the flash memory device.

In order to identify a block for reclaiming within a small subset of blocks available, it is preferred in present concepts that oldest blocks can be preferred to look at first for the reason that such old blocks are not being written for a long time for the reason these blocks can fully be occupied which in turn can indicate only few valid pages remaining in such blocks. In this context, a large number of updates can result in a small number of valid pages left. However, it turns out that for large systems with a large number of pages per block and operating under uniformly distributed random small user writes, a scheme where only a subset of oldest blocks is investigated for identifying a block to be erased, can still reduce the write amplification, but the rate of improvement in this respect can decrease the more number of pages are allocated to a block. The reason for this is that the distribution of valid pages contained in the blocks residing within the subset of oldest blocks is biased because the blocks that contain a small number of valid pages can already be removed in previous cycles of reclaiming blocks. In addition, blocks containing a large amount of static data being rarely updated can show up amongst the oldest blocks but can still contain many valid pages that need to be relocated prior to an erasure. On the other hand, other blocks containing few valid pages can still be updated quite often and barely make it therefore into the subset of oldest block for being identified for erasure although being suited for being reclaimed.

Figure 5:
FIG. 5 is a schematic illustration of a data structure used in a data storage device according to an embodiment of the present invention.

Hence, according to the present idea the block to be erased is identified from a first subset of n blocks out of a set of m blocks which first subset of n blocks is a proper subset of the set of m blocks, i.e. n<m. A data structure is maintained for providing the m blocks of the set of m blocks in a sorted fashion, for example according to an age index. Such data structure can be represented by a list, a queue or a ring, or a pointer pointing towards the blocks. A schematic example of such data structure 5 in form of a queue is shown in FIG. 5, in which data structure m positions 1 . . . m are provided for holding m blocks sorted according to a criterion. Such criterion can be the age of a block which age in the present context can be defined as a time period since the block is written at last. In this context, an old block which shows a long period in time since the block was written at last can in many instances represents a block that is fully occupied for quite some time by valid and invalid pages such that no new data can be written to such block any longer. However, other blocks that are not written for quite some time due to lack of data to be updated can represent an old block, too. Of course, the age of a block can be determined by means of a time stamp a block was written at last. A block is understood to be of older age compared to a block of younger age, when the time period since the older block was written at last exceeds the time period since the younger block was written at last. The m blocks of the set of m blocks can be sorted according to their age—which age also is denoted as age index—and can be arranged in the data structure such as a queue, for example, by increasing or decreasing age, for example.

According to one aspect, for determining n blocks for the first subset, the blocks from/residing at n positions in the data structure are included in the first subset. The n positions preferably are predefined positions. In the present aspect, a composition of the first subset of n blocks can contain at least one block from a position in the data structure that holds a block younger than the n oldest blocks in the data structure. For example, the data structure including the m blocks sorted by decreasing age with the oldest block residing at the first position of the data structure, the first n positions represent the presently n oldest blocks out of the set of m blocks. For selecting blocks to be included in the first subset of n blocks at least one block is taken from a position other than the n first positions, which holds a block that does not belong to a group of the n oldest blocks. Such concept allows for younger blocks in the data structure to be selected for the first subset that in turn is investigated for identifying a block for erasure. In such first subset of n blocks, the investigation/search for a block suited for erasure can be carried out sequentially amongst the blocks being sorted according to age. In an embodiment, every v-th block from the data structure can be chosen for the first subset of blocks with v being an integer and v>1, such that blocks are considered for the first subset from positions 1, 1+v, 1+2*v, . . . , 1+(n−1)*v in the data structure/queue. Parameter v can be fixed, or can be dynamically varying over repeated applications of the reclaiming process. Position 1 denotes the first position in the queue holding the oldest block of the data structure.

According to another aspect, the positions in the data structure from which the blocks are selected for inclusion in a subset can vary for each block reclaiming cycle. Given that a first subset of n blocks out of the set of m blocks can be selected by including blocks from n positions in the data structure, a second subset of p blocks out of the set of m blocks can be selected by including blocks from p positions in the data structure, where the n positions differ at least in one position from the p positions. Positions of subsequent subsets of blocks can differ from previous ones in at least one position. In case n=p and for each block reclaiming cycle the number of blocks in the associated subset remains the same, a block from at least one different position in the data structure can be included in the subsequent block reclaiming cycle in which the second subset of p blocks is composed. In case n is not equal to p, the first and the second subset differ in blocks from at least one different position in the data structure.

For example, the first subset of blocks can contain blocks residing in positions 1, 2, . . . n in the data structure with such positions being subsequent positions starting at position 1 of the data structure the oldest block is mapped to. Then, a search for a suitable block for erasure can be carried out sequentially amongst these blocks representing the first subset sequentially amongst the blocks ordered, for example according to an age index, which sequence can then be represented by blocks at positions 1, 2, . . . n again. In a next cycle of identifying a block to be erased, a second subset of p=n blocks can be composed from, e.g. p=n blocks then residing at p positions in the data structure which p positions can differ in at least one position from the n positions the blocks are selected for in the previous reclaiming cycle. For example, blocks at p=n successive positions following the n-th position in the data structure are building the second subset in a next block reclaiming cycle, and so on. Generally, the set of these p=n positions can be shifted by v (modulo some number) in every reclaiming cycle with respect to a reference position which can, for example, be the first position or the last position used in the data structure for selecting a block from in the previous reclaiming cycle.

In another preferred embodiment, the n=p positions are varying by shifting them one position to the right (modulo v). Thus, in a first cycle of the reclaiming process the blocks at positions 1, 1+v, 1+2*v, . . . , 1+(n−1)*v in the queue are examined, in a second run of the reclaiming process blocks at positions 2, 2+v, 2+2*v, . . . , 2+(n−1)*v in the queue are examined, at the k th run blocks at positions k, k+v, k+2*v, . . . , k+(n−1)*v in the queue are examined, and at the with run blocks at positions v, 2*v, . . . , n*v in the queue are examined. This pattern is continuously repeated, such that at the (v+1)th run blocks at positions 1, 1+v, 1+2*v, . . . , 1+(n−1)*v in the queue are examined again. In another embodiment, positions can be shifted by an arbitrary amount to the right in the queue, i.e. up-shifted, or to the left in the queue, i.e. down-shifted with a rotation occurring according to modulo v.

Hence, it is preferred in this aspect that the second subset of blocks is built in a different way than the first subset, i.e. blocks from different positions in the data structure are selected for building the second subset of blocks than are selected for building the first subset of blocks. In the above examples, the value of v can be either fixed or varying over multiple reclaiming cycles. It is noted that between the two block reclaiming cycles, the memory can be continued to be read and written, and insofar the data structure can be updated such that different blocks reside at the positions in the data structure.

The criterion according to which a block out of a subset of blocks is identified can either be known in advance, or can be dynamically obtained by monitoring the number of relocated pages at an initial phase, or at regular intervals. It can be dynamically adjusted as the operational characteristics of the system change. Once a block is identified in the search process the preparation for erasure of such block can include copying, transferring or rewriting all valid subunits of this block to one or more other blocks subject to availability of free pages on such other blocks.

The proposed block reclaiming scheme can perform efficiently and fast. Its corresponding computation time measured in CPU cycles and write amplification are very low, and also blocks are worn out as evenly as possible and to a very little degree. The proposed block reclaiming mechanism can dynamically be adjusted as the operational characteristics of the system change. Various tradeoffs are possible in terms of write amplification, implementation complexity, and latency. In such way, an efficient and fast process of reclaiming units can be implemented for solid state storage devices, and also for log-structured file systems.

In the figures, same or similar elements are denoted by the same reference signs.

FIG. 1 shows a flow chart of a method according to an embodiment of the present invention.

In step 10 the method is started. In step 11 a counter <last> is set to −1 and a sequence of blocks to be examined, i.e. the first subset, is specified out of the a set of m blocks, for example according to any one of the subset composition mechanisms as described in the previous paragraphs. In step 12 the block reclaiming process investigates a next block j in the sequence of blocks present in the first subset of blocks. In step 13 it is determined if such block j is a better candidate for reclaiming than the block that is presently identified as preferred block in variable <last>. The criterion employed here can be the number of valid pages of a block. Thus, a candidate block j presently investigated is considered to be better than the recorded block considered to be preferred so far and indicated by the variable <last>, if the number of its valid pages is less than the number of valid pages of the recorded block in <last>. If the present block j is better than the block identified by <last> (Y), then <last> is set to j in step 14. If not (N), it is determined if the sequence of blocks of the first subset to be investigated is exhausted in step 15. If the sequence is not yet exhausted (N) in step 15, then the next block in the sequence is considered in step 12. If the sequence is exhausted (Y) and consequently all blocks in the sequence have been examined, the block identified by <last> is the block that will be reclaimed. This implies that all valid pages of this block are relocated in another block, or blocks, in step 16, and before it is erased, again in step 16. The process defining a block reclaiming cycle is stopped in step 17, and a new block reclaiming cycle can be started again in step 10 in case the free block queue indicated that the number of free blocks in the free block queue is less than a threshold. In case of such trigger for reclaiming another block, the present steps 10 to 17 can be repeated for identifying another block fulfilling the criterion out of the blocks that then contribute to the first subset. Since in the meantime, reads and writes were applied to the memory and the order of blocks in the queue can have changed between two cycles even if the fixed positions are taken from the queue for building the subsets for each cycle, the blocks in the subset can be different across multiple block reclaiming cycles.

Figure 2:
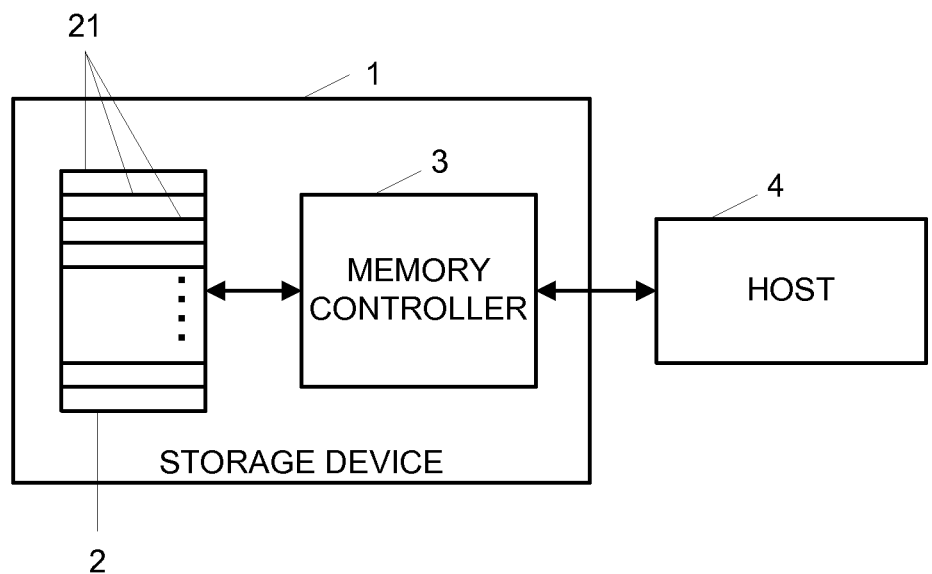
FIG. 2 is a block diagram of a storage device according to an embodiment of the present invention.

FIG. 2 shows a block diagram of a storage device according to an embodiment of the present invention. The storage device 1 includes a flash based solid state memory 2 with a block/page memory space structure. Few of the blocks are indicated as 21. A memory controller 3 is controlling the activities of the flash memory 2—as such the memory can be described as a computerized memory. The memory controller 3 specifically is adapted for writing data to and reading data from the memory 2, and for executing all administrative tasks in connection with the reading and writing of data. Specifically, the memory controller 3 writes updates to a page of a block to one or more blocks different to the block the outdated data is contained in a "write out-of-place" fashion. When doing so, the memory controller 3 flags the one or more pages containing the outdated data as invalid. From time to time, the memory controller 3 executes a search amongst a specified subset of blocks in order to identify a block that matches a predetermined criterion, which in the present embodiment is the least number of valid pages in such block. Once such block is identified, the memory controller 3 initiates the rewriting of data of valid pages of this identified block to pages of another block, and possibly even to multiple other blocks. In this context, the memory controller 3 is responsible for running a method according to any of the embodiments described above. The memory controller 3 further is connected to a host 4 which makes use of the storage device 1 for storing data. Hence, the host 4 issues read and/or write commands to the storage device 1.

Figure 3:
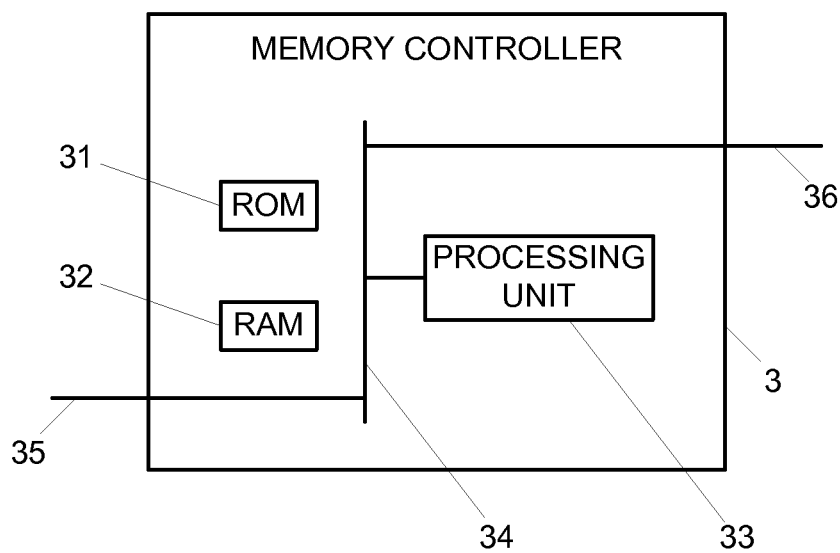
FIG. 3 is a block diagram of a memory controller according to an embodiment of the present invention.

In order to implement the method according to any one of the embodiments as described above, the memory controller 3 preferably provides a computer program code preferably stored in a non-volatile, non-rewritable storage medium such as a ROM 31, see FIG. 3. The storage controller further provides a RAM 32 for loading the program code into, and a processing unit 33 for executing the program code in the RAM 32. Internal communication systems 34 are provided for communicating between the components of the memory controller 3, and an interface 35 is provided for communicating with the flash memory, while another interface 36 can be provided for any communication with the host.

Figure 4:
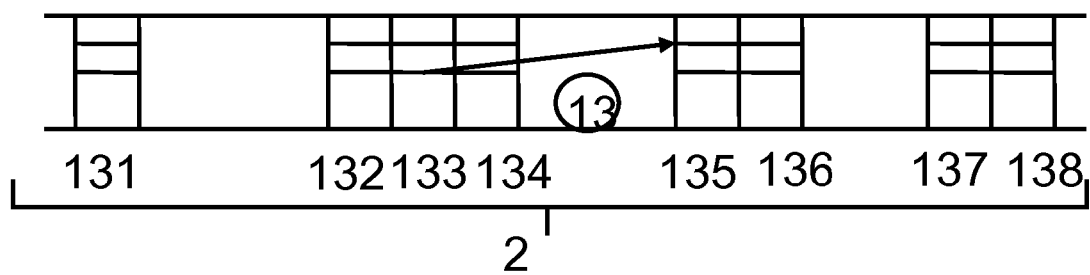
FIG. 4 is a schematic illustration of a portion of the memory space of a flash based memory according to an embodiment of the present invention.

FIG. 4 schematically illustrates a part of a flash memory 2 organized in blocks of which few blocks 131 to 138 are explicitly shown. Pages are indicated as horizontal stripes in a column like illustrated block. All the blocks 131 to 138 are data blocks adapted for holding user data and can include pages containing invalid data and pages containing valid data. In the present example, it is assumed that block 133 has been identified for erasure by means of the above process. As a result, the pages containing valid data are copied, i.e. rewritten to another block, i.e. block 135 in the present example, which block currently supports the writing of new or updated data. With respect to such relocation of data, logical to physical address mappings are updated. According to the present routine, the respective pages in block 133 now containing outdated data are flagged as invalid pages. In a next step, entire block 133 can be erased, and can be added to in a free block queue.

As will be appreciated by one skilled in the art, aspects of the present invention can be embodied as a system, method or computer program product. Accordingly, aspects of the present invention, in particular in form of the controller, can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention, such as the read and write methods, can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for managing a computerized memory for storing data wherein the memory comprises a set of m units and each of the m units comprises subunits, the method comprising:

maintaining a data structure for providing the m units in a sorted way, selecting a first subset of n units out of the set of m units with n<m by selecting units from n positions in the data structure searching in the first subset to identify a unit that matches a predetermined criterion, and rewriting data of valid subunits of the unit identified in the first subset into at least another unit; and selecting a second subset of p units out of the set of m units with p<m by selecting units from p positions in the data structure, searching in the second subset to identify a unit that matches a predetermined criterion, and rewriting data of valid subunits of the unit identified in the second subset into at least another unit, wherein the p positions in the data structure differ in at least one position from the n positions in the data structure, wherein the units are sorted in the data structure according to an age of the units, and the units of the first subset are selected from the data structure by including the units from every v-th position in the data structure, with v being an integer and v>1, while omitting from the first subset intermediate units in between the every v-th position in the data structure.

2. The method according to claim 1, wherein (i) data updates are performed by writing data updates out-of-place, (ii) data updates to outdated data are written to a subunit different from a subunit containing the outdated data, and (iii) the subunit containing the outdated data is invalid, while a subunit containing up-to-date data is a valid subunit.

3. The method according to claim 1, wherein an age of a unit is defined as a time period since the unit was last written, and wherein the units are sorted in the data structure according to one of increasing and decreasing age.

4. The method according to claim 1, wherein the units of the second subset are selected from the data structure by including the units from positions that are offset in the data structure by v positions in a first direction with y being an integer and v>0 with respect to the positions used for selecting the units for the first subset.

5. The method according to claim 1, wherein the first subset is selected at a first point in time, the second subset is selected at a second point in time following the first point in time, and wherein in between the first point in time and the second point in time the data are read from and written to the memory.

6. The method according to claim 5, wherein during the first point in time and the second point in time the data structure is updated, and wherein the first point in time and the second point in time denote points in time a unit reclaiming process is triggered.

7. A method for managing a computerized memory for storing data wherein the memory comprises a set of m units and each of the m units out of the set of m units comprises subunits, the method comprising:

maintaining a data structure in which the m units are sorted according to an age of the units wherein the age of the unit is defined as a time period since the unit was last written;

selecting a first subset of n units out of the set of m units with n<m by selecting units from n positions in the data structure;

searching in the first subset to identify a unit that matches a predetermined criterion; and rewriting data of valid subunits of a unit identified in the first subset into at least another unit, wherein the first subset of units is selected from the data structure by including the units from every v-th position in the data structure, with v being an integer and v>1, while omitting from the first subset intermediate units in between the every v-th position in the data structure.

8. The method according to claim 7, wherein (i) data updates are performed by writing data updates out-of-place, (ii) data updates to outdated data are written to a subunit different from a subunit containing the outdated data, and (iii) the subunit containing the outdated data is invalid, while a subunit containing up-to-date data is a valid subunit.

9. The method according to claim 7, wherein the criterion involves the number of valid subunits of a unit.

10. The method according to claim 7, wherein the unit with the lowest number of valid subunits amongst all the units of the first subset or the second subset is identified.

11. The method according to claim 7, wherein the memory is one of a non-volatile solid state memory device and a memory of a log-structured file system.

12. The method according to claim 7, wherein the memory is a flash memory device, and wherein the units are blocks and the subunits are pages of the flash memory device.

13. A computer program product comprising a non-transitory computer readable storage medium having computer readable program code embodied therewith, the computer readable program code comprising computer readable program code configured to perform a method according to claim 1.

14. A storage device, comprising:

a memory comprising a set of m units wherein each of the m units comprises subunits and the subunits contain either up to date data in a valid subunit or outdated data in an invalid subunit;

a data structure in which the m units are sorted according to an age of the units wherein the age of a unit is defined as a time period since the unit was last written; and a memory controller adapted to write data updates to a subunit different from the subunit the outdated data is contained, wherein the memory controller is further adapted to (i) select a first subset of n units out of the set of m units with n<m by selecting units from n positions in the data structure, (ii) search in the first subset to identify a unit that matches a predetermined criterion, and (iii) rewrite data of valid subunits of a unit identified in the first subset into at least another unit, and wherein the memory controller is further adapted to (i) select a second subset of p units out of the set of m units with p<m by selecting units from p positions in the data structure, (ii) search in the second subset to identify a unit that matches a predetermined criterion, and (iii) rewrite data of valid subunits of a unit identified in the second subset into at least another unit, wherein the p positions in the data structure differ in at least one position from the n positions in the data structure, and wherein the first subset of units is selected from the data structure by including the units from every v-th position in the data structure, with v being an integer and v>1, while omitting from the first subset intermediate units in between the every v-th position in the data structure.

* * * * *